United States Patent [19]

Ohmura

[11] Patent Number: 5,363,585
[45] Date of Patent: Nov. 15, 1994

[54] CASTING HANDLE FOR FISHING RODS
[75] Inventor: Ryuichi Ohmura, Shizuoka, Japan
[73] Assignee: Fuji Kogyo Co., Ltd., Shizuoka, Japan
[21] Appl. No.: 53,858
[22] Filed: Apr. 29, 1993
[30] Foreign Application Priority Data
Apr. 30, 1992 [JP] Japan .................... 4-137730
[51] Int. Cl.⁵ .............................. A01K 87/02
[52] U.S. Cl. ........................... 43/23; 43/18.1
[58] Field of Search ............ 43/23, 22, 20, 18.1, 43/18.5

[56] References Cited
U.S. PATENT DOCUMENTS

| | | | |
|---|---|---|---|
| 4,334,378 | 6/1982 | Worth | 43/22 |
| 4,646,462 | 3/1987 | Ohmura | 43/23 |
| 4,653,217 | 3/1987 | Ohmura | 43/22 |
| 4,916,848 | 4/1990 | Childre | 43/23 |
| 4,918,852 | 4/1990 | Yamato | 43/23 |

*Primary Examiner*—P. Austin Bradley
*Assistant Examiner*—Chuck Y. Mah
*Attorney, Agent, or Firm*—Wegner, Cantor, Mueller & Player

[57] ABSTRACT

A casting handle for fishing rods including a lowermost end; a reel seat portion; an elongated protrusion comprising an index finger recess comprising an index finger front wall and a middle finger recess comprising a middle finger back wall; and an index finger collar portion that is bulgedly outwardly extended from side surfaces of the collar portion to above the reel seat portion so as to define a surface having ridges on the side surfaces, said surface being tangential to a plane defined by the front wall of the index finger recess.

2 Claims, 1 Drawing Sheet

CASTING HANDLE FOR FISHING RODS

BACKGROUND OF THE INVENTION

The present invention relates to a casting handle for fishing rods, which is provided with a recess with which the index finger is engaged, and is designed to positively receive a casting reel thereon.

In order to assure the required distance and accurate direction in casting, a fishing rod must be handled in a well-stabilized state, and in order to handle the fishing rod in that state, index finger grip power, is very important. For this purpose, there are casting handles for fishing rods, which includes a reel seat provided with a recess.

In the case of casting, a large force must be applied to the fishing rod, especially by fingers. Increasing the grip power of the index finger only by forming a recess for index finger does not assure the optimum increase in grip power. Such a problem may be solved by increasing the depth of that recess, but most of the current recesses reach the limits in terms of depth, because they cannot extend beyond the rod-surface.

An object of the invention is therefore to provide a casting handle for fishing rods, which can assure sufficient index finger grip power and, moreover, can enable casting to be done with increased stability.

SUMMARY OF THE INVENTION

According to the invention, the object mentioned above is achieved by the provision of a casting handle for fishing rods having a index finger-engaging recess in the reel seat portion, wherein the reel seat portion is provided outer periphery with a collar portion which is bulgly outwardly extended the front wall of the index finger-engaging recess.

Preferably, the collar portion terminates above the lowermost end.

The collar portion which is bulgly outwardly extended the front wall of the index finger-engaging recess, creates an area of contact of the fore site of the index finger with the reel seat portion.

BRIEF DESCRIPTION OF THE DRAWINGS

The present invention will now be explained, by way of example but not by way of limitation, with reference to the accompanying drawings, in which.

PREFERRED EMBODIMENTS OF THE INVENTION

Figure 1:
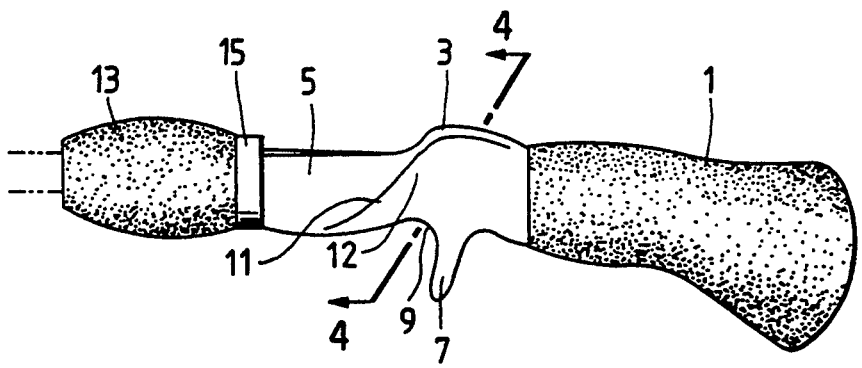
FIG. 1 is a front view of the casting handle for fishing rods according to the invention, with a movable hood mounted thereon.

As can be seen from FIG. 1, a handle body 1 is fixedly provided at its distal end with a reel seat or reel seat portion 5 having a fixed hood portion 3 on an upper side of its rear end. Below the reel seat 5 there is provided a trigger 7, and in front of this trigger 7 there is provided a recess 9 within which the index finger is engaged in.

Figure 4:
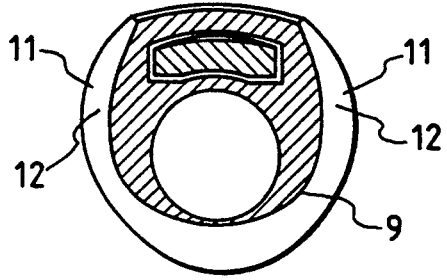
FIG. 4 is a sectional view taken along the line A—A of FIG. 1, which is an illustration how the collar extends.

The reel seat 5 is provided with a collar 11 therearound, which extends forwards and downwards from the front end of the fixed hood 3 and terminates at a front wall 12 of the recess 9, where that wall 12 bulges outwards As can also be understood from FIG. 4, (that is a sectional view taken along the line A—A of FIG. 1 and is a clear illustration of how the collar 11 extends out), even when the fishing rod is cast with a transversely mounted casting reel, good-enough index finger grip power is assured, because the collar 11 extends from the front end of the fixed hood 3.

With a movable hood 13 screwed onto the distal end of the reel seat 5, a casting reel's leg is put between the fixed hood portion 3 and a hood portion 15 of the moving hood 13. Then, the moving hood 13 is further screwed to mount the casting reel in place.

It is noted that the collar 11 itself assures enough grip power, and so the trigger 7 can be dispensed with or, should rather preferably be eliminated for certain special purposes such as palming in particular. However, the trigger 7 is needed for casting with the casting reel upwards.

Figure 2:
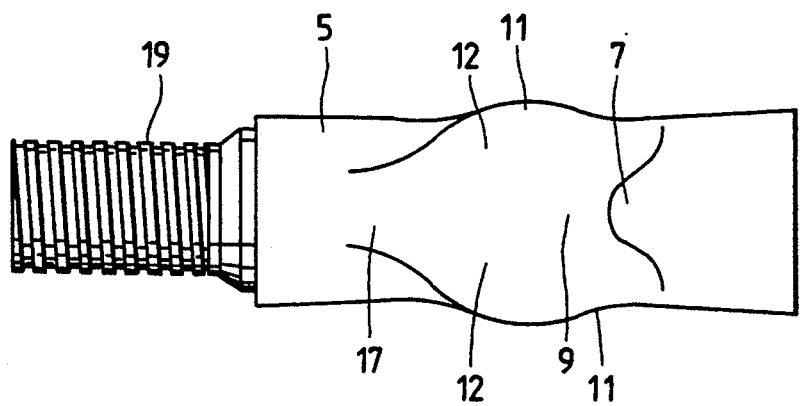
FIG. 2 is a bottom view of the reel seat used in the invention.

Referring now to FIG. 2, the collar 11 terminates above the lowermost end 17 of an intermediate portion of the reel seat 5. In other words, no collar part is provided on the lower side of the reel seat 5. If some collar part is provided on the lower side of the reel seat, then difficulty is involved in shifting the fishing rod from one hand to the other for firmer gripping.

In FIG. 2, notice that reference numeral 19 stands for an external thread onto which the moving hood 13 is screwed (see FIG. 1).

Figure 3:
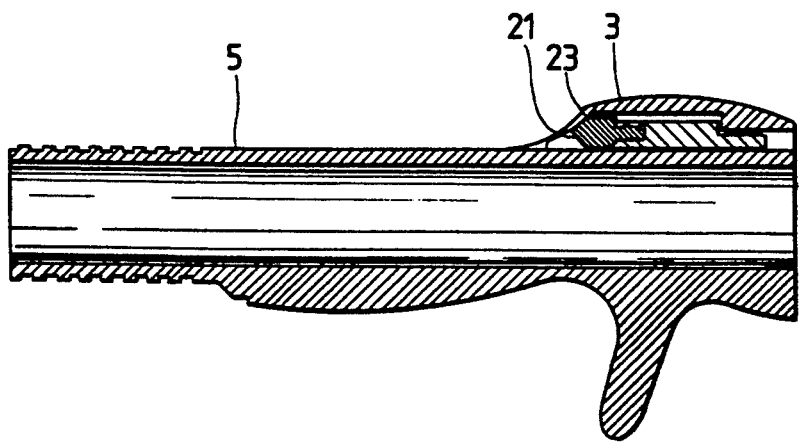
FIG. 3 is a sectional view of the reel seat used in the invention.

As can be best seen from FIG. 3, inside of the fixed hood portion 3 there is a keep member 23 that has a surface 21 for receiving the casting reel leg.

As can be understood from what has been described, the use of the casting reel for fishing rods according to the invention enables casting to be done with higher stability, because there is an increase in the area of contact of the fore side of the index finger with the reel seat portion. In addition, the front wall of the enlarged recess within which the index finger is engaged gives rise to an increase in the grip power of the ring finger during palming, thus making the pulling-back of the fishing rod easier.

According to the invention, the collar terminates above the lowermost end and no collar part is provided on the lower side of the reel seat. This enables the fishing rod to be firmly held for palming.

What is claimed is:

1. A casting handle for fishing rods comprising
   a lowermost end;
   a reel seat portion;
   an elongated protrusion comprising
      an index finger recess comprising an index finger front wall and
      a middle finger recess comprising a middle finger back wall; and
      an index finger collar portion that is bulgedly outwardly extended from side surfaces of the collar portion to above the reel seat portion so as to define a surface having ridges on the side surfaces, said surface being tangential to a plane defined by the front wall of the index finger recess.

2. A casting handle for fishing rods according to claim 1 wherein the collar portion terminates above the lowermost end, the front wall is convex and the back wall is concave.

* * * * *